March 6, 1928.
B. A. SMALL
CLIP FOR TIRE CHAINS
Filed Nov. 13, 1926
1,661,707
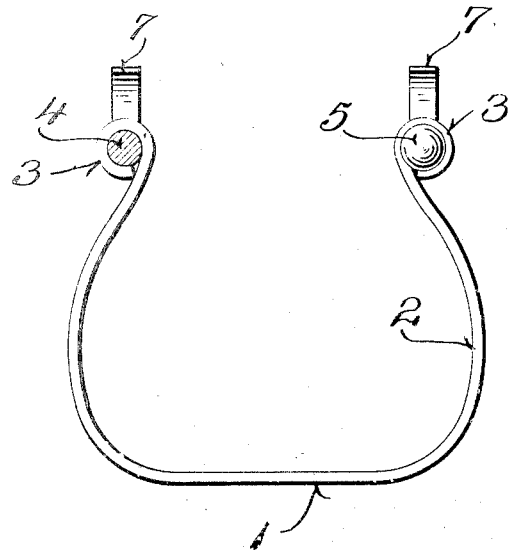
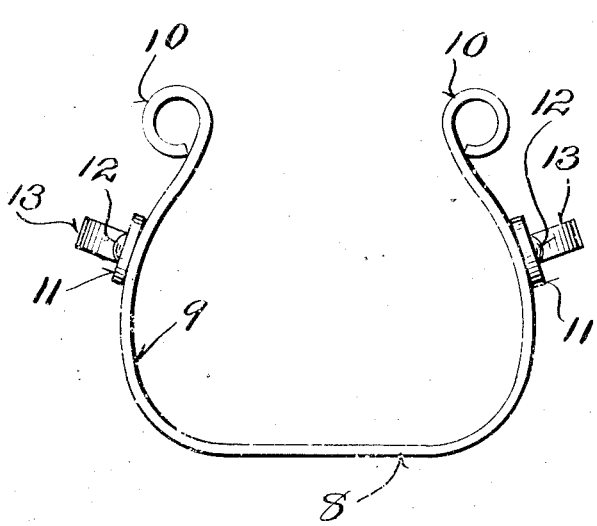
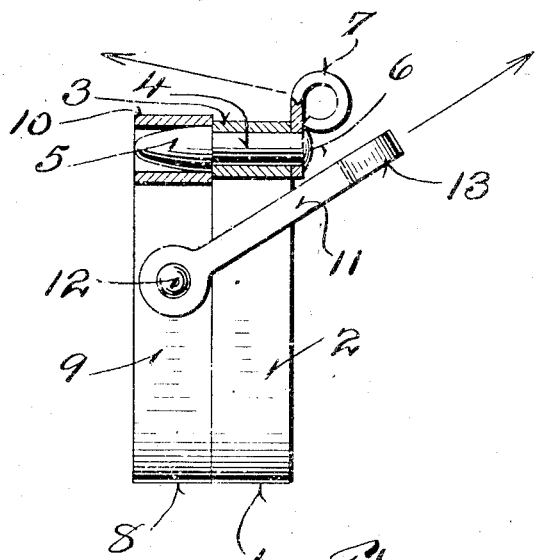
Inventor
Bertram A. Small
By
Attorneys Patented Mar. 6, 1928.

1,661,707

UNITED STATES PATENT OFFICE.

BERTRAM A. SMALL, OF CHICAGO, ILLINOIS.

CLIP FOR TIRE CHAINS.

Application filed November 13, 1926. Serial No. 148,297.

This invention relates to clips for tire chains.

In certain types of tire chains, spring clips are employed at their ends for gripping the tires and holding the chains in position. These spring clips can be used either with the manually applied chains or with chains which are automatically applied to the tires while the car is in motion.

In clips of this type, as heretofore constructed, it has been found that crystallization rapidly takes place and the spring soon breaks from continual bending and pounding on the roadway.

From extensive experimentation with these spring clips, it has been found that the rapid crystallization can be overcome by giving the spring clips a peculiar shape as hereinafter set forth, so that the clip presents a relatively flat outer face, and does not present a rounded or projecting outer face as has heretofore been the practice.

Objects of this invention are, therefore, to provide a novel form of spring clip for tire chains which is so constructed that it will last a great length of time, and is free from crystallization when in use.

Further objects are to provide a novel form for the spring clips which are so related that they will positively interlock and prevent separation of the ends of the chain.

Further objects are to provide a very sturdy, rugged, and reliable construction, which is simple and easy to produce, and easy to apply.

An embodiment of the invention is shown in the accompanying drawings in which:

Figure 1 is a view showing one of the clips adapted for attachment to one end of the chain, such view showing one of the pins in section;

Figure 2 is a corresponding view of the other clip;

Figure 3 is a view partly in section showing the two clips as they appear when in use.

Referring to the drawings, particularly Figure 1, it will be seen that one of the clips comprises a flattened outer face 1 and rounded side arms 2 which terminate in eyelets 3. These eyelets receive the shank 4 of the coupling pins, such coupling pins having enlarged elongated heads 5 which are tapered and rounded at their outer ends and provided with abrupt shoulders contacting with the eyelets 3. The other ends of the pins are riveted in place, as indicated at 6 in Figure 3. Further, the shanks carry small transverse eyelets 7 which receive one of the ends of the chain.

The other clip is provided with a flattened outer portion 8 and rounded arms 9 corresponding to the portions 1 and 2, as described in connection with Figure 1. This clip, however, is provided with relatively larger eyelets 10 which receive the projecting heads 5 of the pins, as shown in Figure 3. Further, the clip is provided with rearwardly projecting and slanting arms 11 which are secured by rivets 12 to the arms 9. The links or arms 11 are provided with eyelets 13 for the reception of the other ends of the chains.

From Figure 3, noting particularly the direction of the arrows which indicate the direction of the adjacent portions of the chain, it will be seen that the clips overlap on the tire, that is to say, one of them is positioned back of the other so that the pull of the chain tends to urge the clips into intimate engagement with each other and the pins cooperating with the eyelets positively lock the clips in position.

It has been found from actual practice with different forms of spring clips for tire chains that the final shape assumed by the clip is as indicated in Figures 1 and 2, and that the rounded projecting portion of the clip is flattened in use and, consequently, the forces necessary to secure this decided flattening are sufficient to crack the spring or to cause rapid crystallization due to the pounding of the projecting portion of the clip upon the roadway. With this invention, however, the clips are given this shape, as found by actual experiments, and with the new form of clip, it has been found that crystallization does not occur and that the spring clips last for a material length of time and reduce chafing and wearing of the tire.

It will be seen further that very simple interlocking means have been provided for the spring clip so that the necessity for latches, dogs, or other fasteners of this type, which necessarily are frail and complicated, is avoided. Further, it will be seen that the interlocking means can be very readily operated and is positive in its action and of sturdy and reliable construction.

Further, it is to be noted that with the ordinary type of tire chains, if one of the chains breaks, the entire device is lost. However, with this invention, loss of the chain is prevented even if it breaks, for the spring clips hold the chain and engage the tire at four points. The chain will, of course, strike the mud guard and warn the operator. He may then immediately remove the chain. It will be seen, therefore, that this invention also supplies a long felt want in respect to preventing loss of the chains due to a breaking of a part thereof.

Further, as pointed out above, it will be seen that the clips are given initially the shape that they naturally tend to assume in actual use, as found by experiments, and consequently the minimum amount of strain is imposed on the clips during actual service.

The rounded arms terminating in the eyelets grip the sides of the tire and retain the clip in place while the flattened outer portions engage the roadway and are not unduly deflected or bent.

Although the invention has been described in considerable detail, such description is intended as illustrative rather than limiting as the invention may be variously embodied and as the scope of such invention is to be determined as claimed.

I claim:

1. A pair of tire chain clips adapted to be positioned with the ends of the chains crossing, said clips each comprising arched arms adapted to grip the tire and terminating in eyelets, connecting pins having shanks securely held within the eyelets of one clip, and having rounded tapered heads positioned within the eyelets of the other clip.

2. A pair of tire chain clips adapted to be positioned with the ends of the chains crossing, said clips each comprising arched arms adapted to grip the tire and terminating in ends which are located inwardly with reference to the general contour of the clip, and telescopic interengaging means carried by such ends for locking the clips together.

In testimony that I claim the foregoing I have hereunto set my hand at Milwaukee, in the county of Milwaukee and State of Wisconsin.

BERTRAM A. SMALL.